March 2, 1926. 1,574,948
F. TORKA
MEANS FOR CLAMPING FOCUSING DEVICES TO CAMERAS
Filed May 12, 1923 2 Sheets-Sheet 1

Inventor
Frank Torka
By Mason Fenwick & Lawrence
Attorneys

March 2, 1926.
F. TORKA
1,574,948
MEANS FOR CLAMPING FOCUSING DEVICES TO CAMERAS
Filed May 12, 1923  2 Sheets-Sheet 2
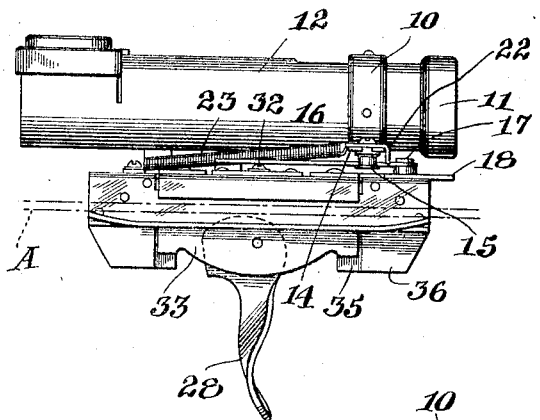
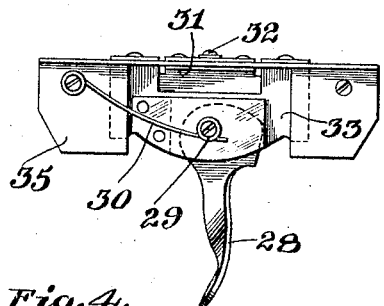
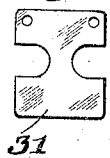
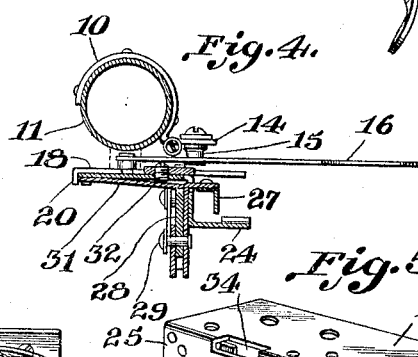
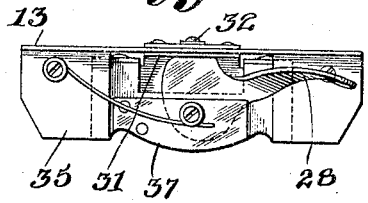
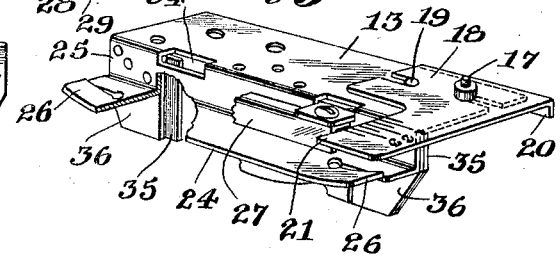
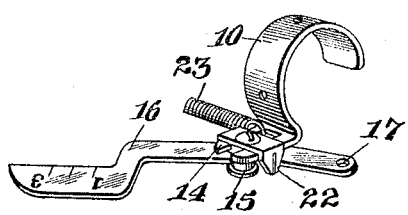
Inventor
Frank Torka
By Mason Fenwick & Lawrence,
Attorneys Patented Mar. 2, 1926.

1,574,948

UNITED STATES PATENT OFFICE.

FRANK TORKA, OF PORT TOWNSEND, WASHINGTON.

MEANS FOR CLAMPING FOCUSING DEVICES TO CAMERAS.

Application filed May 12, 1923. Serial No. 638,553.

*To all whom it may concern:*

Be it known that I, FRANK TORKA, a citizen of the United States, residing at Port Townsend, in the county of Jefferson and State of Washington, have invented certain new and useful Improvements in Means for Clamping Focusing Devices to Cameras; and I do hereby declare the following to be a full, clear, and exact description of the invention, such as will enable others skilled in the art to which it appertains to make and use the same.

This invention relates to improvements in means for clamping focusing devices to cameras.

The various novel features of the invention will appear from the detailed description taken in connection with the accompanying two sheets of drawings forming a part of the specification.

In the drawings Fig. 1 is a plan view of the focusing device showing the same in operative relation with the lens carriage of a camera.

Figure 3 is a view similar to Fig. 2 but showing the clamping jaw in released position.

Fig. 4 is a vertical cross section taken on line 4—4 of Fig. 2.

Fig. 5 is a perspective view of the attachment, the tubes and other parts being omitted.

Fig. 6 is a side elevation of the device with the tubes omitted said view being taken from the outside of the device as compared with Fig. 2.

Fig. 7 is a view similar to Fig. 6 but showing the clamping lever as holding the jaw in clamping position.

Fig. 8 is a perspective view of an operating assembly including a saddle-like member adapted to be mounted on one of the tubes and including the lever for operating the tube.

Fig. 9 is a perspective view of a detail shown in Fig. 8.

Fig. 10 is a plan view of another detail.

Figure 1:
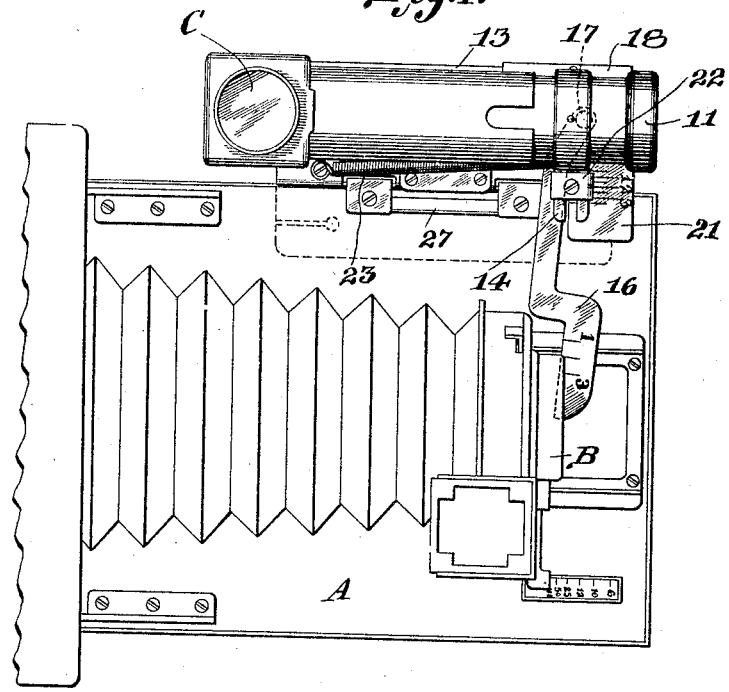
Figure 2:
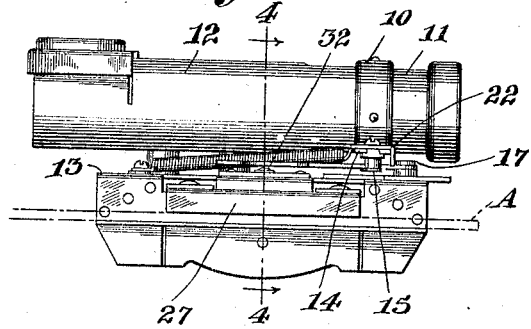
Fig. 2 is a side elevation of the improvement looking at the side which will be disposed adjacent the bed or table of the camera, the latter being shown in dotted outline.

In the drawings A indicates the bed or table of a camera on which is a lens carriage B which is adjustable for focusing purposes. The attachment is designed to be secured to one side of the table and the movable tube of the focusing device is adapted to be operated by a lever which extends across the path of movement of the camera lens. It will be understood that the camera lens will be adjusted until the image of the object to be photographed is clearly formed on the ground glass C of the focusing device.

Numeral 10 indicates a fixture in the form of a semi-circular strap adapted to be secured to the tube 11 which is telescopically received within a tube 12 which latter is spaced from and affixed to a base 13 in any suitable manner. The tube 11 has an objective at its outer end and the tube 12 has a reflecting mirror and ground glass screen C as will be readily understood.

The saddle-like fixture 10 has a lateral lug 14 projecting therefrom near the bottom but at one side of the tube 11. This lug is slotted and has received therein an adjustable fulcrum pin 15 which depends toward the base 13 into the path of a lever 16, this lever being also known as a proportion lever.

The lever 16 extends across the table A of the camera a sufficient distance to have its free end in the path of movement of the lens carriage so that when the lens carriage is moved forwardly the lever 16 will also move the tube 11 outwardly.

The lever 16 is pivoted at one of its ends on a pivot post 17 mounted on a plate 18 which is adjustably mounted at the forward end of the base 13. The plate 18 is adjustable parallel with the common axis of the tubes 11 and 12. The adjustment between the base 13 and plate 18 is conveniently obtained by providing the front end of the base with a slot through which the pivot post 17 may extend and by slotting the remote end of the plate 18 and providing a pin 19 on the base 13 in line with the said slot in the plate 18. The pivot post 17 may conveniently be a threaded and headed bolt, the head of which will underlie the base 13. The lever 16 may be confined on the pivot 17 as by means of a small nut. In the drawings there is shown a spacer member on the pivot post for spacing the lever 16 somewhat from the plate 18.

The plate 18 may be provided with an angular flange 20 adjacent the outer longitudinal edge of the base 13 and its other end is provided with an extension 21 on which scale marks may be inscribed. For co-operation with these scale marks there is provided a binder 22 which is mounted on the lateral lug 14 on the fixture 10, said binder being relatively fixed with respect to the fulcrum 15 with which the lever 16 engages to move the tube 11 outwardly when the lens carriage of the camera is similarly moved. The tube 11 of the focusing device is drawn rearwardly by means of a coil spring 23 which at one end is affixed to the tube 11 through the medium of the fixture at the lug portion 14 of the latter, the other end of the spring being suitably anchored at a remote point to the base 13.

From the above description it will be plain that the tube 11 will be moved in a certain definite ratio with respect to the lens carriage of the camera and that such ratio may be varied by adjusting the fulcrum pin 15 in the lug 14. The spring 23 will tend to hold the proportion lever 16 against the lens carriage inasmuch as the said lever contacts with the fulcrum pin 15 behind the same. It may also be pointed out at this time that the fixture 10 serves not only for carrying the fulcrum pin 15 against which the lever 16 reacts but also serves as a stop to prevent complete entry of the tube 11 into the larger tube 12.

Focusing devices of the character indicated are designed to be attached to the bed of the camera on which the lens carriage is movable and it becomes quite a problem to provide satisfactory means for attaching the focusing device to the bed for the reason that unless the attaching means is properly coordinated with the base on which the focusing tubes are mounted there is interference between the proportion lever and the attaching means; or the attaching means becomes clumsy and otherwise more or less unsatisfactory.

In the present instance the attaching means has been so constructed that the device can be readily attached and detached from the camera bed by merely moving a lever which serves to operate a clamping jaw and the operative parts for the clamping mechanism are so disposed that there is no interference between the other movable parts of the focusing device.

Referring now to the clamping device numeral 24 indicates a shelf which extends laterally from a web 25 which joins the base 13 and said shelf. As shown in the drawings the base 13, shelf 24 and web 25 are formed from a piece of sheet metal, the shelf 24 and base 13 being arranged in stepped relation. The ends of the shelf 24 are slit to provide spring-like tips 26 which are bent upwardly somewhat as shown, whereby to exert a better gripping action. The shelf 24 will be disposed below the camera table A and a clamping jaw 27 will serve to clamp the camera table to the shelf.

The clamping jaw is mounted for sliding movement toward and from the shelf 24 and is moved toward the same by a cam lever 28 which is pivoted as at 29 to the clamping jaw. The jaw is moved away from the shelf 24 by means of a spring finger 30 which is anchored at one end to the web 25 and at its other end extends below the pivot 29. The cam part of the lever 28 cooperates with an abutment 31 in the nature of a plate which is affixed to the remote edge of the base 13. The free end of the abutment 31 may be displaced toward or away from the shelf 24 by means of an adjusting screw 32 which is mounted in the base 13. This adjustment 31 permits the final or clamping position of the jaw 27 to be varied with respect to the shelf 24 between which and the jaw the lens supporting table A of the camera is confined. The desirability of this adjustment will become apparent when it is pointed out that the camera beds or tables are oftentimes of different likenesses for different cameras.

The main body of the clamping jaw comprises a U-shaped member 33, the legs of which extend through slots 34 in the base 13 adjacent the web 25, the free ends of the legs being bent over and connected by a bridge member in the form of an angle iron, this bridge member constituting the jaw 27. The member 33 is a plate which is confined to up and down movement by means of plates 35 which are spaced from and secured to the web 25 between the base 13 and shelf 24. The plates 35 are spaced from the web 25 by means of plates 36 which also serve as guides between which the jaw is vertically movable.

There may be provided in connection with the jaw plate 33 a plate 37 between which and the jaw plate 33 the cam lever 28 may be mounted. The provision of the plate 37 will serve to hold the lever 28 against undesirable wabbling.

The cam lever 28 is bent away from the web 25 to provide a more readily graspable terminal and this terminal is given a 90° twist for convenience in handling.

What is claimed is:—

1. In combination, a guide member, a clamping jaw slidable in said member, a laterally projecting shelf toward which said jaw is movable to clamp the flat object thereagainst, a cam lever mounted on the jaw and laterally extending abutment on said guide against which the cam reacts to move the jaw toward the shelf.

2. In combination, a guide member, a clamping jaw slidably mounted in the said member, a pair of oppositely directed spaced-apart shelves between which said guide member extends and is secured, said jaw movable toward the lower of said shelves to clamp a flat object thereagainst, a cam lever pivoted on the jaw and movable in a plane parallel with the plane of movement of the same, the cam of said lever reacting against the upper shelf whereby to move the jaw into clamping position.

3. The combination as specified in claim 1, and said shelf having its ends slit to provide yieldable finger-like members which are bent upwardly and out of the plane of the shelf.

4. In combination, a clamping jaw, a guide in which said jaw is mounted for right line movement, a shelf extending laterally from the guide below the clamping edge of the jaw, a second shelf extending laterally from said guide on the other side thereof and above the first shelf, a cam lever pivoted to the jaw for movement in a plane parallel to the plane of movement of the same, and an adjustable abutment for the cam of the said lever to react against, said abutment carried by the upper shelf.

In testimony whereof I affix my signature.

FRANK TORKA.